United States Patent [19]
Keller

[11] Patent Number: 5,317,240
[45] Date of Patent: May 31, 1994

[54] KINESCOPE DRIVER APPARATUS WITH CONTRAST ENHANCEMENT

[75] Inventor: Anton W. Keller, Zurich, Switzerland

[73] Assignee: RCA Thomson Licensing Corporation, Princeton, N.J.

[21] Appl. No.: 906,313

[22] Filed: Jun. 29, 1992

[51] Int. Cl.$^5$ ............................................. H01J 29/52
[52] U.S. Cl. ..................................................... 315/383
[58] Field of Search ..................... 315/383; 358/27, 32, 358/164, 169

[56] References Cited

U.S. PATENT DOCUMENTS

| | | | |
|---|---|---|---|
| 4,118,731 | 10/1978 | Hinn | 358/65 |
| 4,295,160 | 10/1981 | Lagoni | 358/31 |
| 4,366,440 | 12/1982 | Olson et al. | 358/164 |
| 5,083,198 | 1/1992 | Haferl et al. | 358/32 |

Primary Examiner—Theodore M. Blum
Attorney, Agent, or Firm—Joseph S. Tripoli; Peter M. Emanuel; Richard G. Coalter

[57] ABSTRACT

A high voltage, inverting, kinescope driver amplifier is coupled at the input thereof to a source of low voltage video input signals to be amplified and is coupled at the output thereof for supplying amplified video output signals to the cathode of a kinescope. The high voltage amplifier includes linear and non-linear feedback paths which, in combination, determine a nominal closed loop gain for the amplifier. The non-linear path includes amplitude and frequency dependent elements for increasing the closed loop gain of the amplifier by a given amount in low brightness areas (black to gray) displayed by the kinescope (thus improving dark picture detail) and increases the closed loop gain of the amplifier by substantially the same given amount for high frequency video detail signal components in high brightness picture areas (thus improving subjective contrast without spot blooming and avoiding the impression of "washed-out" pictures.

9 Claims, 6 Drawing Sheets

KINESCOPE DRIVER APPARATUS WITH CONTRAST ENHANCEMENT

FIELD OF THE INVENTION

This invention relates to television systems and particularly to kinescope cathode driver apparatus with provisions for enhancing the contrast of displayed images.

BACKGROUND OF THE INVENTION

Figure 1:
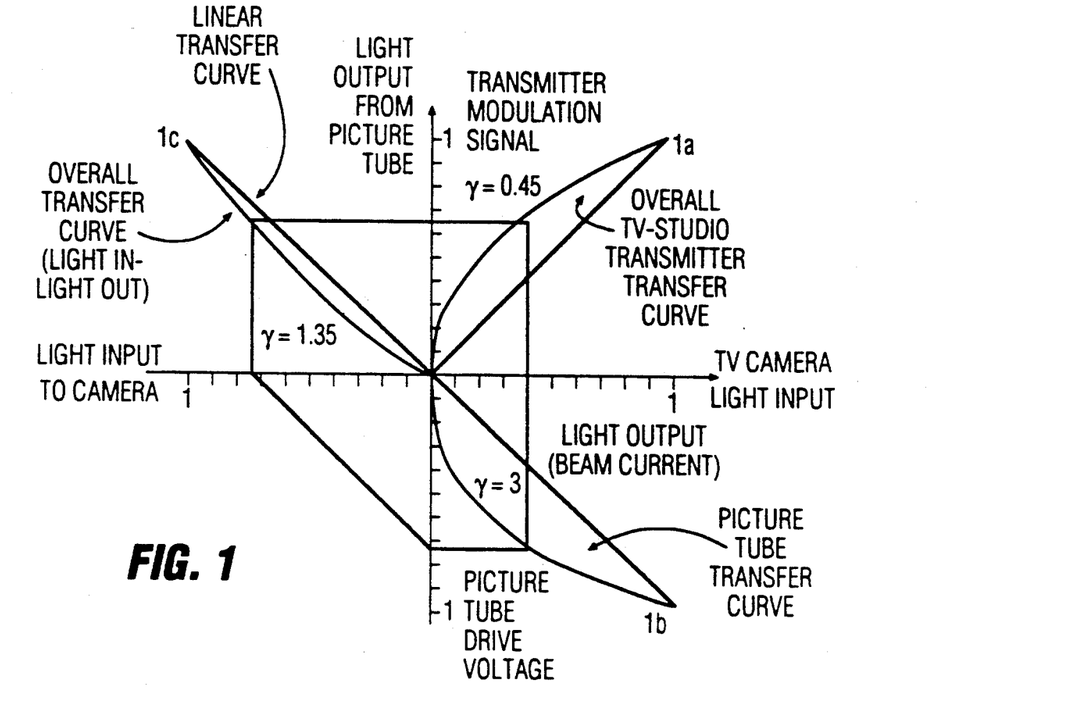
FIG. 1 is a diagram showing exemplary transfer characteristics and gamma values for a television transmitter, a television receiver and the overall television system including the transmitter and receiver.

In an ideal television system the light output produced by a kinescope would be linearly related to the light applied to a camera pick-up tube. In practical systems, neither the camera tube or the display tube are linear devices. In other words, the signal voltage produced by a camera tube is not linearly related to the light that is detected and the light produced by a kinescope is not linearly related to the cathode drive voltage applied to it. The relationship between light input and signal output for the camera tube, and the relationships between signal input and light output of the picture tube, are both commonly expressed by the term "gamma" which, simply stated, is the exponent or "power" to which an input function (X) is raised to produce an output function (Y). If, for example, an input function X is raised to the first power (gamma=1) to produce an output function, then the two functions are said to be linearly related. If the output varies as the square of the input function, the value of the exponent (gamma) is equal to "2". If the output varies as the square root of the input function, the "gamma" or exponent equals 0.5. Gamma, in other words, is simply a measure of curvature of a transfer function, FIG. 1 shows the gamma of various aspects of a video signal transmission system, with curve 1a representing the transfer characteristic of the transmission side, curve 1b representing the transfer characteristic of the picture tube (kinescope or "CRT"), and curve 1c representing the overall transfer characteristic.

The transmitted video signals of the NTSC, PAL and SECAM television standards have a gamma of about 0.45 to 0.5 while the picture tube (kinescope) of color television receivers have a gamma of about 2.8 to 3.1. As a result, the overall transfer curve (light into the camera to light output from the picture tube) is not linear and the overall gamma is, in practice about 1.35 instead of a unity (1.0) gamma. The implies that the exponential transfer characteristic of the picture tube is not fully compensated, leading to compression of dark picture portions of the display. Such compression causes picture details near black to be lost, and colored areas to fade to black. Concurrently, whites are excessively amplified with respect to the dark portions to the point of often reaching picture tube saturation and blooming.

Figure 2:
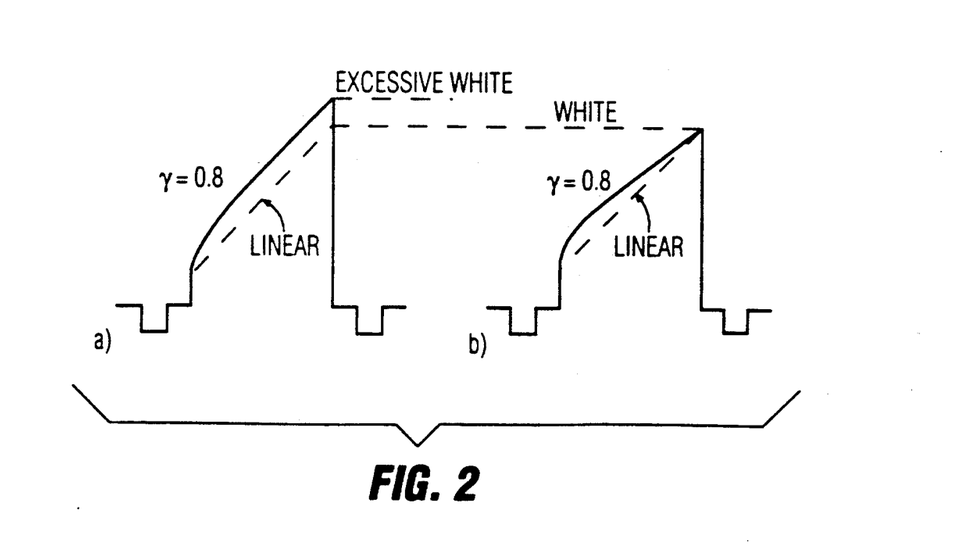
FIG. 2A is a diagram showing a graphical representation of a video ramp signal which has undergone gamma correction.
FIG. 2B is illustrates a modification of the gamma corrected ramp signal of FIG. 2A for preventing picture tube (kinescope) blooming due the gamma correction.

A linear overall transfer characteristic avoids the problem of black compression and can be obtained by an additional gamma correction of about 0.8 in each of the red, green, and blue (R,G and B) signal processing circuits in the television receiver. However, picture tubes have a relatively small dynamic range of light output which can not be enlarged without reaching picture tube saturation causing blooming. Therefore, gamma correction to increase amplification of dark image areas can cause a signal compression of the high signal whites. This is illustrated in FIG. 2A showing a gamma corrected ramp signal. Peak white must be kept at the same level as in the uncorrected case, the dashed line, to avoid picture tube blooming. As a consequence, the upper portion of the ramp signal has a reduced slope as shown in FIG. 2B. This corrects the black compression problem while avoiding the problem of "blooming" (excessive whites).

Reducing the upper portion of the ramp signal to avoid blooming, however, can create another problem. The viewer perceives the reduced signal as a lack of contrast in grey to white picture areas resulting in "washed out" appearing pictures. In such an event, the improvement of contrast of low-brightness portions of the image by gamma correction is obtained at the expense of high brightness contrast deterioration.

A very effective solution to the problem of providing gamma correction while avoiding loss of high brightness contrast is described by Haferl et al. in U.S. Pat. No. 5,083,198 entitled NONLINEAR RGB VIDEO SIGNAL PROCESSING which issued Jan. 21, 1992.

Figure 3:
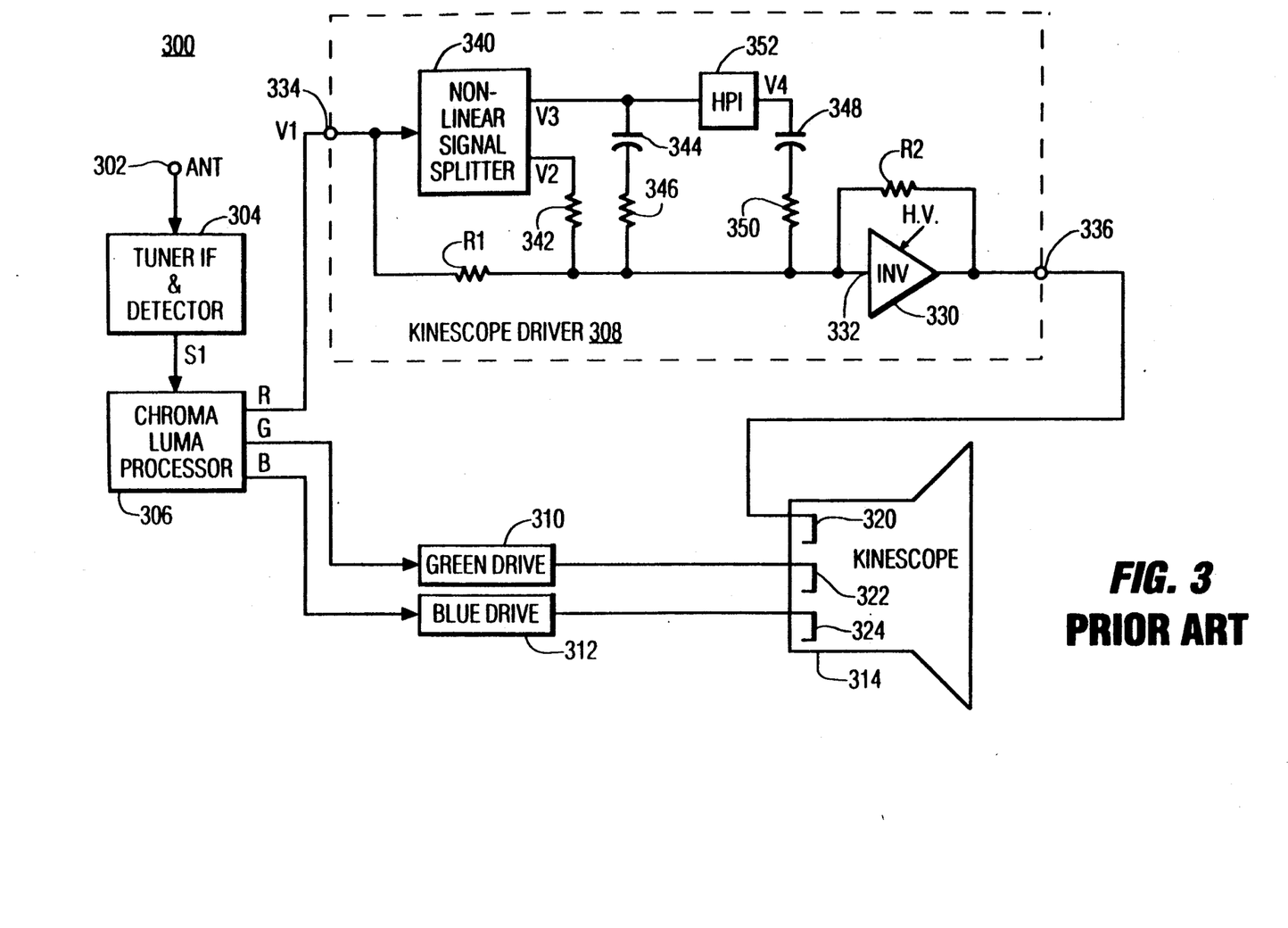
FIG. 3 is a simplified block diagram of a television receiver employing a known (prior art) non-linear RGB kinescope driver apparatus with contrast enhancement.

FIG. 3 herein is an exemplary embodiment of a television receiver (indicated as 300, generally) including kinescope driver circuits 308, 310 and 312 in accordance with an embodiment of the Haferl et al. system. The receiver 300 includes an antenna input terminal 302 that supplies RF input signals to a tuner, IF amplifier and detector unit 304 which produces a baseband video signal S1. A chrominance/luminance signal processor 306, of conventional design, provides functions such as hue and tint control, brightness and contrast control, matrixing, etc., and provides red blue and green (RGB) video color component output signals for display by a kinescope 314. The R,G and B signals are applied to respective cathodes 320, 322 and 324 of the kinescope 314 by means of respective kinescope driver and contrast enhancement circuits 308, 310 and 312. The details of circuit 308 are shown in the drawing. Circuits 310 and 312 are identical to circuit 308 and so are shown in block form to simplify the drawing.

Driver apparatus 308 of the Haferl et al. system includes an inverting, high voltage, kinescope cathode driver amplifier 330 having an input 332 coupled via an input resistor R1 to input terminal 334 (to which the Red video signal is applied) and having an output 336 coupled to the red cathode 320 of kinescope 314 and coupled also back to the amplifier input 332 via a feedback resistor R2. These elements, R1, R2 and inverting amplifier 330, connected as described, provide linear amplification of the video input signal V1 at input 334 with a gain equal to the ratio of the feedback resistor R2 divided by the value of the input resistor R1.

The remaining elements of drive circuit 308 provide non-linear processing of the input signal V1. Specifically, signal V1 is applied to a non-linear signal splitter 340 which splits the input signal V1 into a low level portion V2 representative of black to grey regions of the image and into a high level portion V3 representative of gray to white portions of the image. The low level or dark portion V2 is applied via resistor 342 to the summing input 332 of amplifier 330 and so boosts the picture brightness in the black to gray region. This provides gamma correction of dark scenes and so improves the low light contrast of displayed images. The higher level signal V3 is AC coupled via resistor 346 and capacitor 344 to amplifier 330 for improving large area contrast and is also AC coupled via capacitor 348, resistor 350 and high pass filter 352 to amplifier 330 for improving small area white contrast. Blooming is prevented by the AC coupling and high pass filtering of the gray to white picture signal applied to the high voltage cathode driver amplifier 330. Advantageously, this "dual level" processing enhances detail for both bright and dim areas of displayed images, gamma is more closely corrected and spot blooming is avoided.

SUMMARY OF THE INVENTION

Although the aforementioned Haferl et al. system provides excellent performance, it is herein recognized that substantial further improvement may be obtained and, particularly so, with regard to simplification of the circuitry required.

In accordance with an aspect of the invention, circuit simplification is achieved by effectively combining the functions of the non-linear processing with high voltage amplification of the video driver amplifier. As a result, the kinescope driver amplifier itself becomes part of the non-linear contrast enhancement circuit and eliminates the need, as in the prior art, for separate enhancement and driver circuits. Additionally, the need for splitting the video input signal into separate signal ranges is also eliminated. A further advantage of the present invention is that no active amplifying devices (e.g., transistors) are needed for the non-linear processing. Accordingly, costs are reduced and reliability is enhanced by the reduced component count.

There is herein described a kinescope driver amplifier having a non-linear feedback network which (1) increases the amplification of video signals in black-to-grey picture areas (thus improving dark picture details and increasing saturation of low luminance color signals) and which (2) amplifies video details in high brightness picture areas to substantially the same level as the low-brightness signal (thus improving subjective contrast without spot blooming and avoiding the impression of "washed-out" pictures.)

Kinescope driver apparatus embodying the invention includes a kinescope driver amplifier having an input for receiving a video input signal to be amplified, having an output for providing an amplified video output signal for application to a cathode of a kinescope, and having linear and non-linear feedback paths. The two feedback paths together determine a nominal closed loop gain for the amplifier. The non-linear path increases the closed loop gain of said amplifier by a given amount in low brightness picture areas and increases the closed loop gain of said amplifier by substantially the same given amount for video detail signal components in high brightness picture areas.

BRIEF DESCRIPTION OF THE DRAWING

The foregoing and further features of the invention are illustrated in the accompanying drawing wherein like elements are denoted by like reference designators and in which.

DETAILED DESCRIPTION

As an overview, in the prior art system previously discussed non-linear video processing was applied to low level video signals prior to the amplification thereof to high voltage cathode drive signals and the processing was applied in a feed-forward manner. By contrast, in the example of the invention shown in FIG. 4, the non-linear processing is integrated with the high voltage video output amplifier and this integration is accomplished using feedback rather than feed-forward techniques. Also, as will be seen, the system employs a complex, voltage dependent, impedance for gamma and detail compensation rather than the band-splitting and high pass filtering technique of the prior art.

Figure 4:
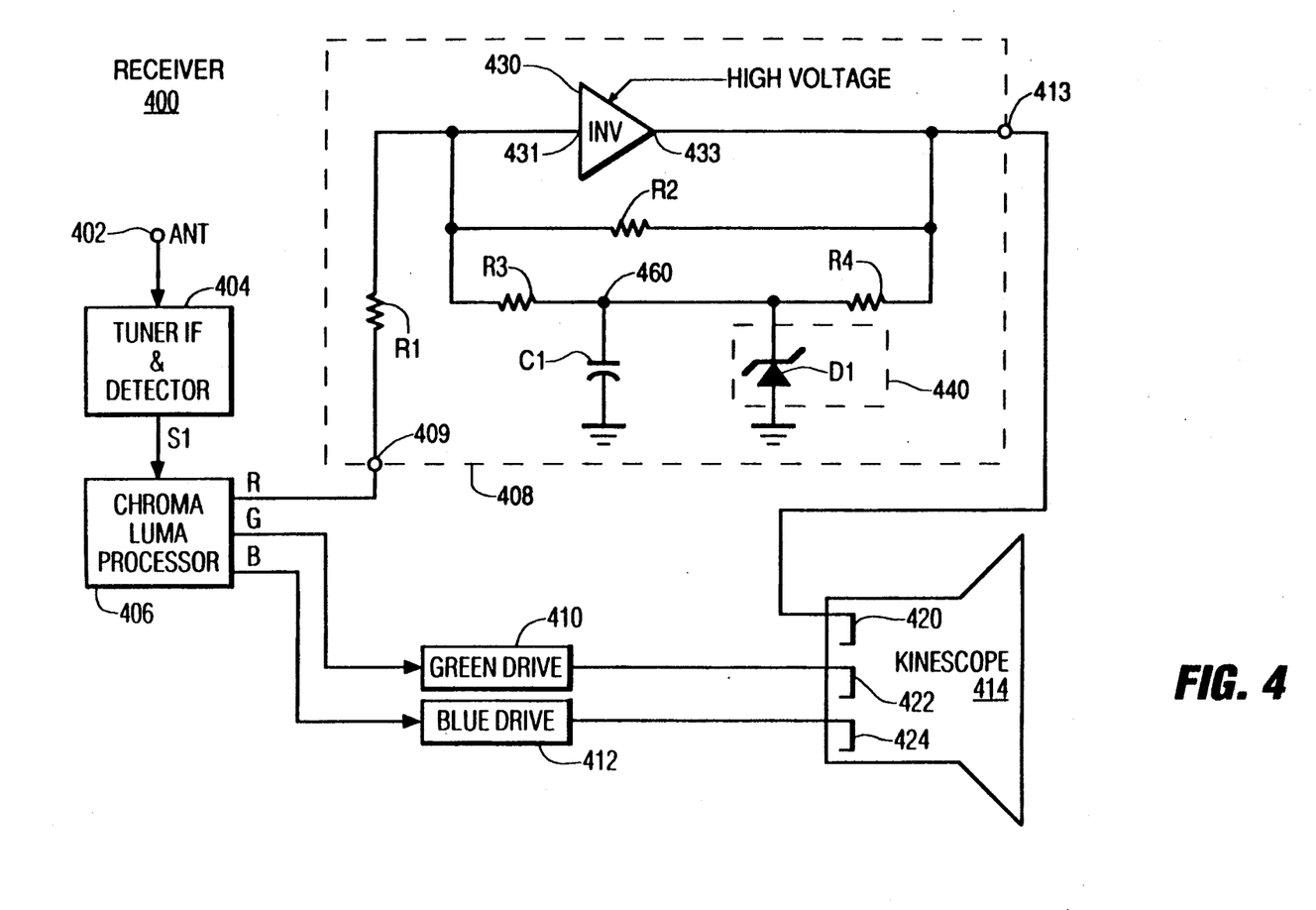
FIG. 4 is a simplified block diagram of a television receiver including contrast enhancing kinescope driver apparatus embodying the invention.

The receiver 400 of FIG. 4 includes an antenna input terminal 402 that supplies an RF input signal to a tuner, IF amplifier and video detector unit 404 which produces a baseband video output signal S1. A chrominance/luminance signal processor 406, of conventional design, provides various functions such as hue and tint control, brightness and contrast control, matrixing, etc., and provides red, (R) blue (B) and green (G) video color component output signals for display by a kinescope 414. The R, G and B signals are applied to respective cathodes 420, 422 and 424 of kinescope 414 by means of respective kinescope driver and contrast enhancement circuits 408, 410 and 412. The circuit details of kinescope driver circuit 408 are shown outlined in phantom. Circuits 410 and 412 may be identical to circuit 408 and so are shown in block form to simplify the drawing.

The kinescope driver circuit, embodying the invention, includes a high voltage, inverting amplifier 430. By, "high voltage" it is meant that the amplifier is of a type capable of producing output voltages of one or two hundred volts or so (e.g., a common range for kinescope cathode driver amplifiers is about 80 to 150 volts or so). The input 431 of amplifier 430 is coupled via an input resistor R1 to a circuit input terminal 409 to which the Red video signal (R) is applied. The output 433 of amplifier 430 is coupled via output terminal 413 to the red cathode 420 of kinescope 414 and is also coupled via a feedback resistor R2 to the input 431 of amplifier 430. The ratio of the feedback and input resistors determines the nominal closed loop gain, G1, of amplifier 430.

The remainder of the circuitry of kinescope driver 408 comprises a non-linear feedback network which applies gamma correction to gray to black portions of displayed images and boosts the high frequency detail in gray to white portions of images. The non-linear network comprises a circuit node 460 that is coupled to the input (431) and output (433) terminals of amplifier 430 via respective resistors R3 and R4 and which is coupled to a point of reference potential (ground in this example) by means of a parallel connection of a capacitor C1 and a voltage dependent impedance 440 which, as shown here, comprises a Zener diode D1 connected at the cathode thereof to node 460 and at the anode thereof to the point of reference potential (ground).

In operation, the voltage gain G (i.e., V in/V out) for the overall circuit is equal to the open loop gain A of amplifier 430 divided by the function 1+AB where B is the feedback fraction. Where, as is usually the case, the open loop gain A is very large compared with unity (e.g., A>>1), the overall closed loop gain G is substantially equal to the reciprocal of the feedback fraction, i.e., G=1/B. Here, there are two feedback paths. The path including resistor R2 is a linear path and is independent of both the amplitude and the frequency of the output voltage of the amplifier. The path including resistors R3 and R4 is a non-linear path. In this path the feedback fraction or current varies both as a function of the amplitude of the output signal and as the frequency of the output signal. Specifically, the feedback fraction for this path decreases as the output signal goes from white to black and the feedback fraction also decreases with frequency as a function of the amplitude of the output signal.

The first of the non-linearities described above provides gamma correction. Since the feedback fraction (i.e., the current fed back) decreases as the output voltage increases (due to the action of the Zener diode D1) the overall closed loop amplifier gain increases since the closed loop gain is inversely proportional to the amount of feed back. A preferred gain change vs amplitude is on the order of about 6 dB for boosting the contrast in grey to black picture areas.

The second of the non-linearities mentioned above is due to the combined effects (interaction) of the capacitor C1 and the switching of the Zener diode D1. As the output voltage changes, the impedance to ground changes as well as the impedance of capacitor C1. The combined effects increase the overall gain (by about 6 dB) for high frequency video detail as the output signal approaches white.

In FIG. 4 a single Zener diode D1 is used to provide the effect of a negative voltage dependent impedance. As the output voltage increases above, for example, the 50 IRE level, the diode becomes conductive thus shunting the negative feedback to ground and changing the circuit gain. The diode D1 exhibits some dynamic and static impedance and so the switching is not abrupt but, as a practical matter provides a moderate smooth transition between the high gain (+6 dB) and normal gain states of the system. This does, however, provide only two discrete gain regions. A suitable voltage dependent impedance could be used in series with the non-linear feedback path to provide a more gradual transition region. Examples include a suitably biased field effect transistor or a varistor.

To summarize the operation of the arrangement of FIG. 4, recall that the gain is determined by the ratio of the feedback impedance and the input resistance in this closed loop system. If diode D1 and capacitor C1 were not present in the circuit, the signal gain G1 would be given by the total resistance of the network divided by the value of R1. The feedback resistance equals the sum of resistors R3 and R4 connected in parallel with resistor R2. Thus the gain, for this assumed condition (D1 and C1 omitted) is given by:

$$G1 = [(R3+R4)//R2]/R1 \quad (1)$$

wherein the // sign indicates "in parallel with".

If the diode D1 or the capacitor C1 is conducting, (as is the case for signals in the white range and for high frequency detail signals) the current in the feedback path R3 and R4 is shunted to ground and so the gain for this condition becomes:

$$G2 = R2/R1 \quad (2)$$

so, for this condition, G2 will always be greater than G1 since the parallel combination of R2 with the sum of resistors R3 and R4 is always less than the value of R2 alone. The values of R3 and R4 are selected to provide a net boost in gain of about 6 dB for gamma correction and high frequency video detail.

If the output voltage at terminal 413 is greater than twice the Zener voltage of diode D1 (and R3 is about equal to R4), then the signal is amplified by G2. Otherwise the amplification will equal G1. Detail signals (frequencies above Fc) are bypassed by C3 and therefore they receive a maximum gain of G2. The corner frequency Fc above which the detail signals are amplified (assuming R3=R4) is given by:

$$Fc = 1/(pi*R3*C1) \quad (3)$$

Figure 5:
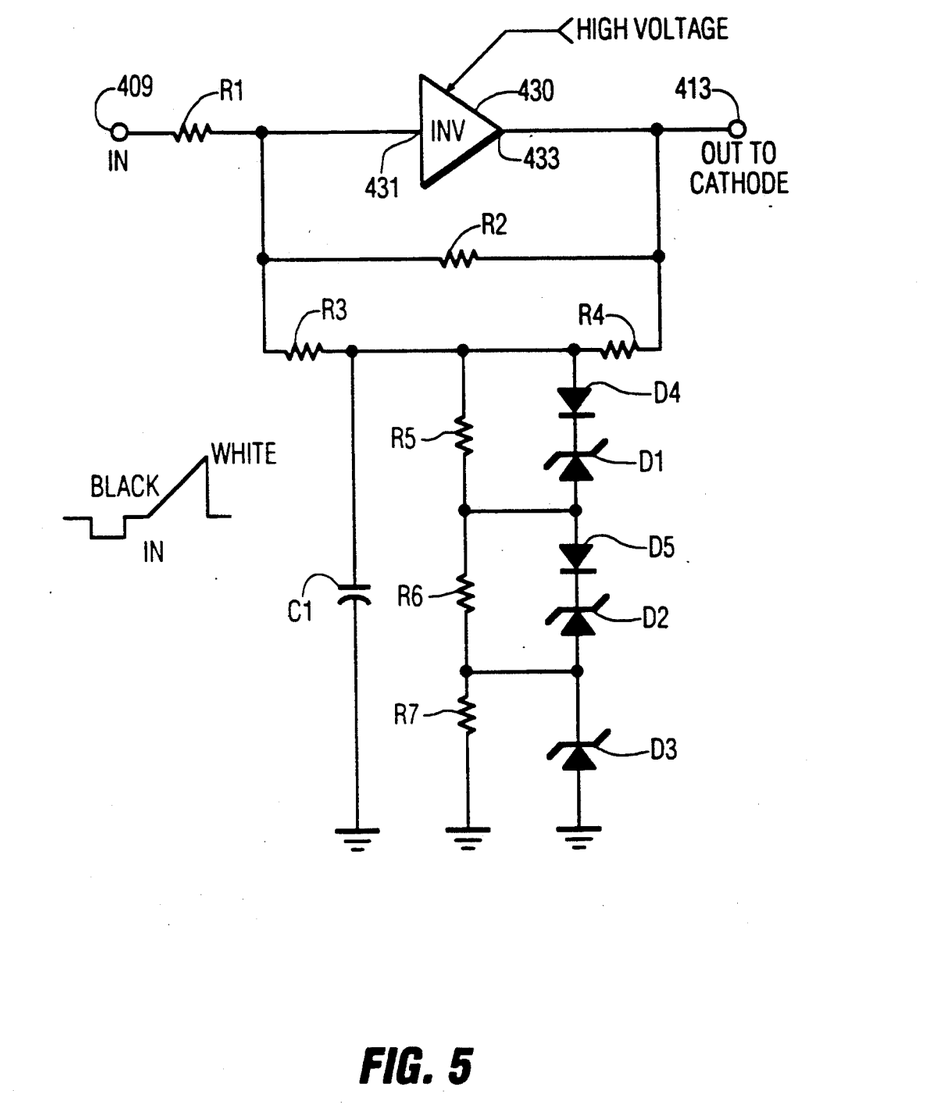
FIG. 5 illustrates a modification of the kinescope driver apparatus of FIG. 4.
Figure 6A:
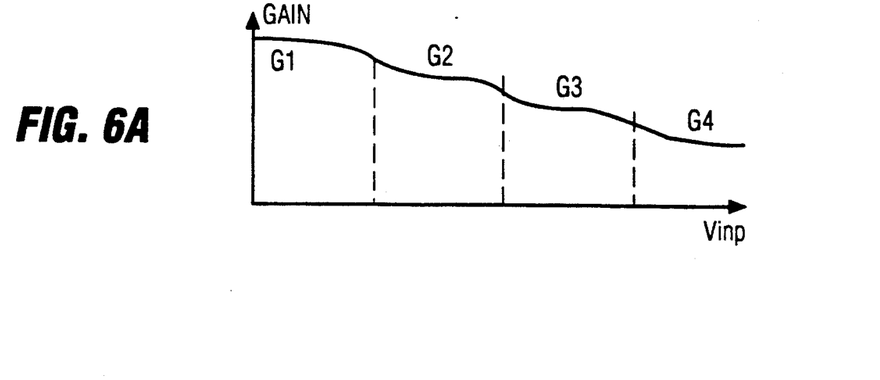
FIGS. 6A, 6B and 6C are transfer response diagrams illustrating gain and frequency responses of kinescope driver apparatus embodying the invention.
Figure 6B:
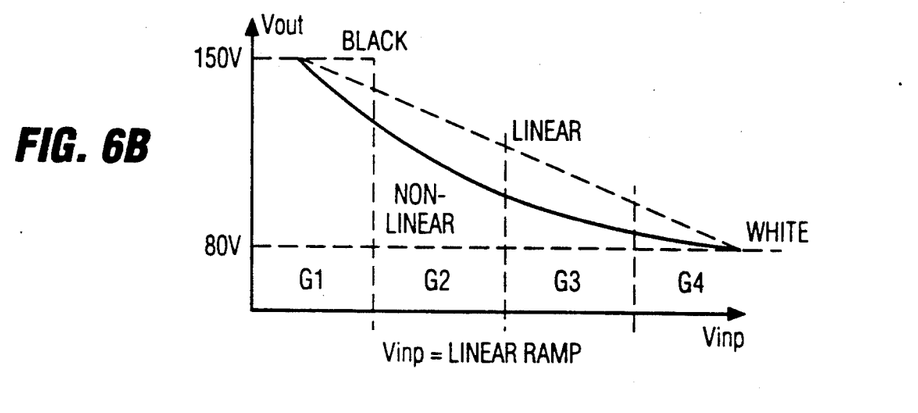
Figure 6C:
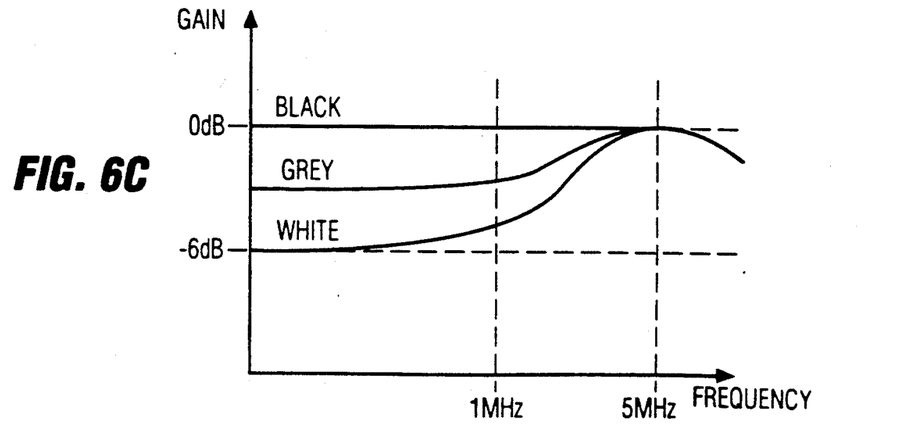

FIG. 5 illustrates a modification of the amplifier of FIG. 4 for providing a smoother gain transition region. To provide a smoother gain change with signal amplitude changes, as shown in FIG. 6A, the system of FIG. 5 includes additional Zener diodes (D2, D3) and parallel resistors (R5, R6, R7). Practical Zener diodes have a dynamic resistance of several tens to hundreds of Ohms and thus so this resistance coupled with the increased number of diodes results in a relatively smooth gain curve. Resistors R5-7 together with R3 and R4 define the gains in the gain regions G1-G4 of FIG. 6A. The small signal diodes D4 and D5 are helpful in improving the sharpness of the switching of the Zener diodes. FIG. 6B illustrates the over-all non-linear amplitude response having increased gain near black level and reduced gain near white level. FIG. 6C illustrates the over-all frequency response where it is seen that signals near white level experience 6 dB of boost at 5 MHz, those near grey level (50 IRE) receive about 3 dB of boost and those near black level receive essentially no additional amplification.

Figure 7:
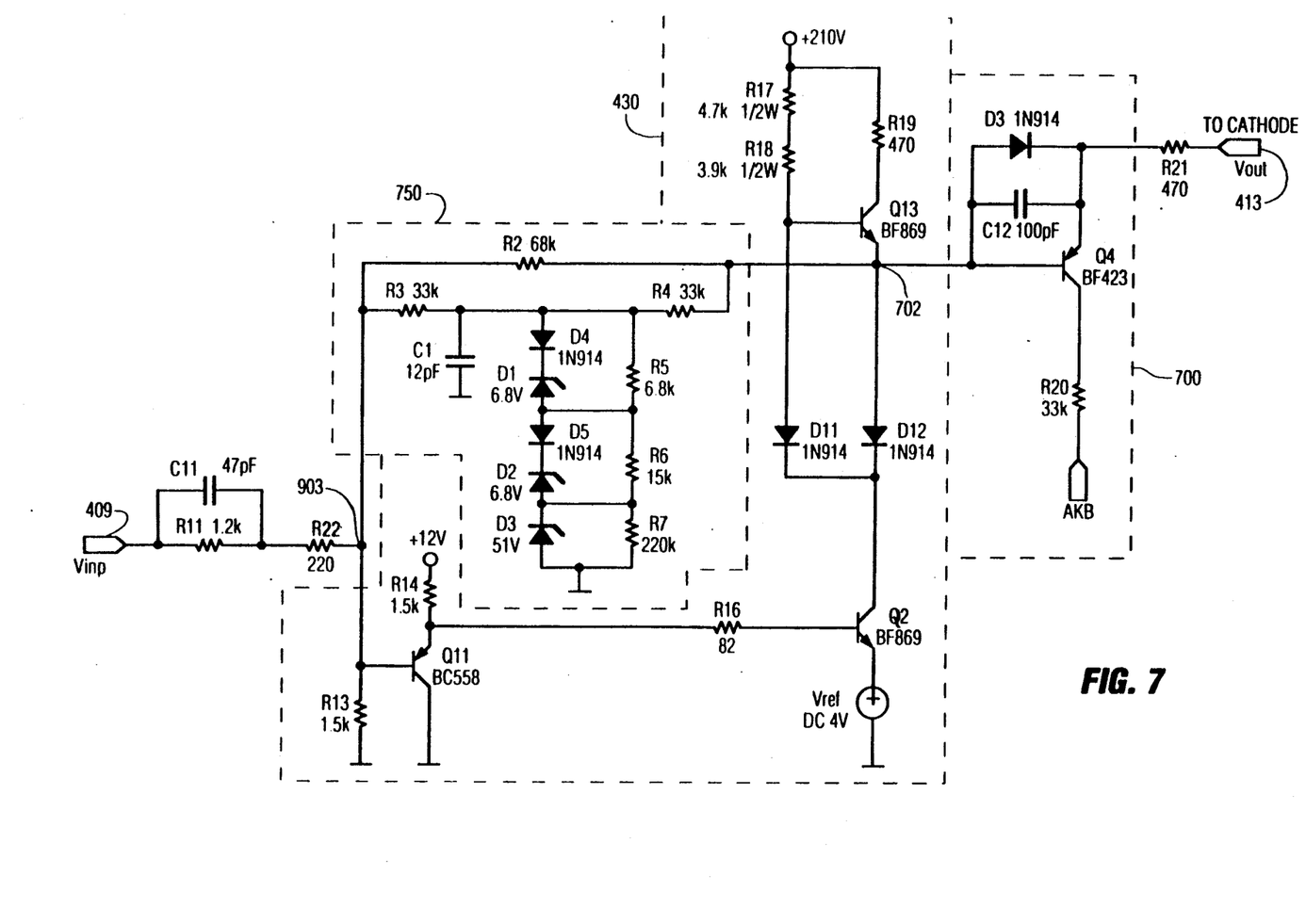
FIG. 7 is a detailed circuit diagram with exemplary circuit element values of kinescope driver apparatus embodying the invention.

FIG. 7 shows the circuit schematic of the video driver apparatus of FIG. 5 and includes exemplary element values. Also shown are the circuit diagram (and element values) of a suitable high voltage inverting video amplifier 430, a suitable automatic kinescope bias current sensing circuit 700 and an input peaking circuit C11/R11. It will be appreciated, of course, that other suitable amplifiers may be used instead. The AKB sensing circuit may be omitted in a given case as well as the input peaking circuit.

The amplifier 430 (outlined in phantom) comprises a common emitter connected NPN transistor Q2 whose emitter (which is the non-inverting input) is coupled to a reference voltage of 4 volts. The collector of Q2 is coupled to conventional active load network comprising transistor Q13, Resistors R17, R18 and R19 and a pair of small signal diodes D11 and D12 connected as shown. This form of "active" load impedance provides a high gain for the amplifier and a relatively low output impedance at the amplifier output node 702. Base drive for the amplifier transistor Q2 is provided by an emitter follower circuit comprising PNP transistor Q11 and resistors R13, R14 and R16 connected as shown. This provides improved input impedance for the amplifier inverting input terminal 903. The output 702 of amplifier 430 is coupled via a automatic kinescope bias (AKB) current sensing network 700 (outlined in phantom) and a 470 Ohm resistor (R21) to a connector 413 for connection to the cathode of the kinescope 314. AKB network 700 includes a PNP transistor Q4 and associated components D3, C12, R20, for sensing output current flow for use by (optional) AKB control circuitry (not shown). The input impedance R1 for the system comprises a network including resistors R1 and R11 in series with R11 being by-passed by a peaking capacitor C11. Thus, in calculating the overall circuit gain, the impedance of the feedback network should be divided by the effective input impedance of these elements which provides a little extra high frequency peaking. If, in a given application, this is not desired, capacitor C11 and resistor R11 may be eliminated.

The feedback network 750 (outlined in phantom) corresponds to that of FIG. 5 except that exemplary element values are given. For the specific values shown the maximum closed loop gain is given by R2/R1 which corresponds to about 50:1 or +34 dB. The nominal closed loop gain is determined by [(R3+R4)//R2]/R1 equals about 25:1 or about 27 dB which is 6 dB less than the maximum boost for gamma correction and for high frequency detail.

Operation of the example of FIG. 9 is substantially the same as in the example of FIG. 5 and so will not be repeated in detail here. It will be noted, for this specific example, that the cut-off voltage assumed for the picture tube connected to terminal 413 is about 150 volts and white appears at around 80 volts. The resistance of R3+R4 is equal to the value of R2 (68K Ohms), therefore the maximum gain is approximately double the minimum gain. Here, R3 is selected to equal R4 but this equality is not essential. The Zener diodes were chosen to give a smooth gain curve in the range of 150 Volts to 80 Volts as shown in FIG. 6A and FIG. 6B. The capacitor C1 and R4 define the frequency Fc to be about 1 megaHertz so that signals well above this level are amplified with blacklevel gain (see FIG. 6C).

There has been shown and described, in accordance with the invention, kinescope driver amplifiers having a non-linear feedback network which (1) increases the amplification of video signals in black to grey picture areas (thus improving dark picture details and increasing saturation of low luminance color signals) and which (2) amplifies video details in high brightness picture areas to substantially the same level as the low-brightness signal (thus improving subjective contrast without spot blooming and avoiding the impression of "washed-out" pictures). Various changes may be made within the scope of the invention including, for example, using threshold break-down devices or variable impedances other than Zener diodes, providing more or fewer gain smoothing regions, using different high voltage amplifier configurations and so forth.

What is claimed is:

1. Amplifier apparatus, comprising:
  an inverting amplifier having an input terminal for receiving a video input signal to be amplified, having an output terminal for providing an amplified video output signal and having linear and non-linear feedback paths; said two feedback paths together determining a nominal closed loop gain for the amplifier;
  said non-linear path including both amplitude and frequency dependent elements and comprising a circuit node coupled via first and second resistors to respective ones of said input and output terminals of said amplifier and including a voltage dependent impedance, a frequency dependent impedance and a source of reference potential coupled in circuit with said node for modifying said closed loop gain of said amplifier;
  characterized in that;
  for driving a kinescope, said output terminal of said amplifier is coupled to a cathode electrode of a kinescope;
  said frequency dependent impedance and said voltage dependent impedance are coupled in parallel between said circuit node and said source of reference potential;
  the values of said frequency dependent impedance, said voltage dependent impedance, said first and second resistors and said source of reference potential being selected for increasing the closed loop gain of said amplifier in low brightness picture areas and for increasing the closed loop gain of said amplifier for high frequency video detail signal components in high brightness picture areas to provide images on said kinescope having expanded low-light contrast and enhanced high-light picture detail.

2. Amplifier apparatus, for driving a kinescope, as recited in claim 1 wherein:
  said voltage dependent impedance includes at least one diode having an anode and a cathode;
  said cathode being coupled to said circuit node; and
  said anode being coupled to said source of reference potential.

3. An amplifier for driving a kinescope as recited in claim 1 further characterized in that:
  said values of said frequency dependent impedance, said voltage dependent impedance, said first and second resistors and said reference potential are selected:
  (1) for increasing said closed loop gain of said inverting amplifier by a given amount in said low brightness picture areas; and
  (2) for increasing said closed loop gain of said amplifier by substantially the same given amount for said high frequency video detail signal components.

4. An amplifier for driving a kinescope as recited in claim 1 further characterized in that:
  said voltage dependent impedance comprises a ladder structure including a plurality of voltage dependent impedances and voltage independent resistances arranged to provide a relatively smooth overall voltage transfer function for said amplifier without abrupt changes, said transfer function having a generally convex shape between black and white output signal representative levels of said video input signal.

5. An amplifier for driving a kinescope as recited in claim 1 further characterized in that:
  said frequency dependent impedance is selected to provide a given amount of high frequency peaking at a given video frequency for video input signals near white level, a lesser amount of high frequency peaking for video input signals of middle gray levels of said video input signal and a minimal amount of peaking for video input signals near black level.

6. Kinescope driver apparatus, comprising:

an inverting amplifier having an input terminal and an output terminal;

means for applying a video input signal to said input terminal of said inverting amplifier;

means for coupling said output terminal of said inverting amplifier to the cathode of a kinescope;

a linear feedback path coupled between said input and output terminals of said amplifier;

a non-linear feedback path coupled between said input and output terminals of said amplifier comprising a circuit node coupled via respective ones of first and second resistors to said input and output terminals, a voltage dependent impedance coupled in parallel with a frequency dependent impedance between said node and a point of reference potential said voltage dependent impedance being selected for increasing the closed loop gain of said amplifier in low brightness picture areas and said frequency dependent impedance being selected for increasing the closed loop gain of said amplifier for video detail signal components in high brightness picture areas for displaying on said kinescope images having expanded low-light contrast and enhanced high-light detail.

7. An amplifier for driving a kinescope as recited in claim 3 further wherein:

said frequency dependent impedance, said voltage dependent impedance, said first and second resistors and said reference potential have values selected:

(1) for increasing said closed loop gain of said inverting amplifier by a given amount in said low brightness picture areas; and (2) for increasing said closed loop gain of said amplifier by substantially the same given amount for said high frequency video detail signal components.

8. An amplifier for driving a kinescope as recited in claim 3 wherein:

said voltage dependent impedance comprises a ladder structure including a plurality of voltage dependent impedances and voltage independent resistances arranged to provide a relatively smooth overall voltage transfer function for said amplifier without abrupt changes, said transfer function having a generally convex shape between black and white representative levels of said video input signal.

9. An amplifier for driving a kinescope as recited in claim 3 wherein:

said frequency dependent impedance is selected to provide a given amount of high frequency peaking at a given video frequency for video input signals near white level, a lesser amount of high frequency peaking for video input signals of middle gray levels of said video input signal and a minimal amount of peaking for video input signals near black level.

* * * * *